(12) United States Patent
Almasan et al.

(10) Patent No.: US 12,242,938 B2
(45) Date of Patent: Mar. 4, 2025

(54) DISTRIBUTED LEDGER BASED FEATURE SET TRACKING

(71) Applicant: American Express Travel Related Services Company, Inc., New York, NY (US)

(72) Inventors: Rares Ioan Almasan, Phoenix, AZ (US); Andras L. Ferenczi, Scottsdale, AZ (US); Mohammad N. Nauman, Peoria, AZ (US); Swatee Singh, Scottsdale, AZ (US); Man Chon U, Sunrise, FL (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 18/425,415

(22) Filed: Jan. 29, 2024

(65) Prior Publication Data

US 2024/0193474 A1    Jun. 13, 2024

Related U.S. Application Data

(63) Continuation of application No. 16/801,945, filed on Feb. 26, 2020, now Pat. No. 11,922,278.

(51) Int. Cl.
| | |
|---|---|
| *G06N 20/00* | (2019.01) |
| *G06F 16/22* | (2019.01) |
| *G06F 16/2453* | (2019.01) |
| *G06F 16/27* | (2019.01) |
| *G06F 16/28* | (2019.01) |

(52) U.S. Cl.
CPC ........ *G06N 20/00* (2019.01); *G06F 16/2255* (2019.01); *G06F 16/24547* (2019.01); *G06F 16/27* (2019.01); *G06F 16/28* (2019.01)

(58) Field of Classification Search
CPC ............... G06N 20/00; G06F 16/2255; G06F 16/24547; G06F 16/27; G06F 16/28; H04L 9/50
See application file for complete search history.

(56) References Cited

U.S. PATENT DOCUMENTS

| | | | |
|---|---|---|---|
| 2019/0065709 A1* | 2/2019 | Salomon | H04L 9/0643 |
| 2022/0012367 A1* | 1/2022 | Ramanan | G06N 3/08 |

* cited by examiner

*Primary Examiner* — Mark D Featherstone
*Assistant Examiner* — Kweku William Halm
(74) *Attorney, Agent, or Firm* — Thomas | Horstemeyer, LLP

(57) ABSTRACT

Disclosed are various embodiments for using a distributed ledger to track the evolution or deployment of feature sets for machine-learning. An approval request to approve creation of a feature set record in a distributed ledger can be received. The approval request can include a feature set hash representing a feature set, a code hash representing a feature set generator, and a data hash representing a data set. An approval decision can be generated for the feature set record based at least in part on the approval request and at least one approval rule stored in an approval data store. The approval decision can be transmitted to a distributed agent. The approval decision can approve or reject creation of the feature set record in the distributed ledger.

20 Claims, 7 Drawing Sheets

DISTRIBUTED LEDGER BASED FEATURE SET TRACKING

CROSS-REFERENCE TO RELATED APPLICATION

This application is a continuation of, and claims priority to and the benefit of, copending U.S. patent application Ser. No. 16/801,945, entitled "DISTRIBUTED LEDGER BASED FEATURE SET TRACKING" and filed on Feb. 26, 2020, which is incorporated by reference as if set forth herein in its entirety.

BACKGROUND

Machine-learning is a technology that is becoming increasingly ubiquitous. For example, financial institutions are often deploying machine-learning models to address problems in system availability, customer marketing, fraud detection and prevention, credit decisioning, etc. The ability of a machine-learning model to use the results of previous decisions to improve future decisions enables machine-learning models to deliver greater accuracy and predictability in their decisions over time.

However, there is often limited insight into where the data for training a machine-learning model originates, how the data was created, and/or how machine-learning features or feature sets are generated from a data set. As a result, it may be difficult or even impossible to identify the historical reasons that a machine-learning model operates in the manner that it does because one cannot track the training data to its source or determine how a data set was turned into a feature set. The problem can be compounded when third-parties, such as government regulators, request this information.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for using distributed ledgers and similar technologies to track the creation and distribution of feature sets used by machine-learning models. Feature sets may often be reused for machine-learning problems other than the ones they were originally designed for. As an example, a feature set generated with one machine-learning problem or model in mind may prove to be similarly useful for a related machine-learning problem or model. For instance, a feature set used to train a financial services machine-learning model to identify products or services to be offered to certain customers might prove similarly useful for training a second financial services machine-learning model to approve or deny applications for financial services products. As a simple example, a feature set that proves useful for training a machine-learning model to identify credit card offers for customers may also prove useful for training a second machine-learning model to solve a related problem of whether to approve or deny customer applications for credit card products. However, it can be difficult to track reusage of feature sets for related purposes, especially if the feature set is reuse by separate team, department, organization, enterprise, etc.

This can present a problem if an auditor or regulator wishes to analyze the data used for training specific machine-learning models. For example, a financial regulator may wish to be able to easily identify the source of the data used to engineer a feature set used for training a machine-learning model used to make credit approval decisions. If the financial regulator is unable to determine where the feature set originated, including the data and code used to create the feature set, then the regulator may not be able to determine the degree to which the feature set causes bias in the machine-learning model.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
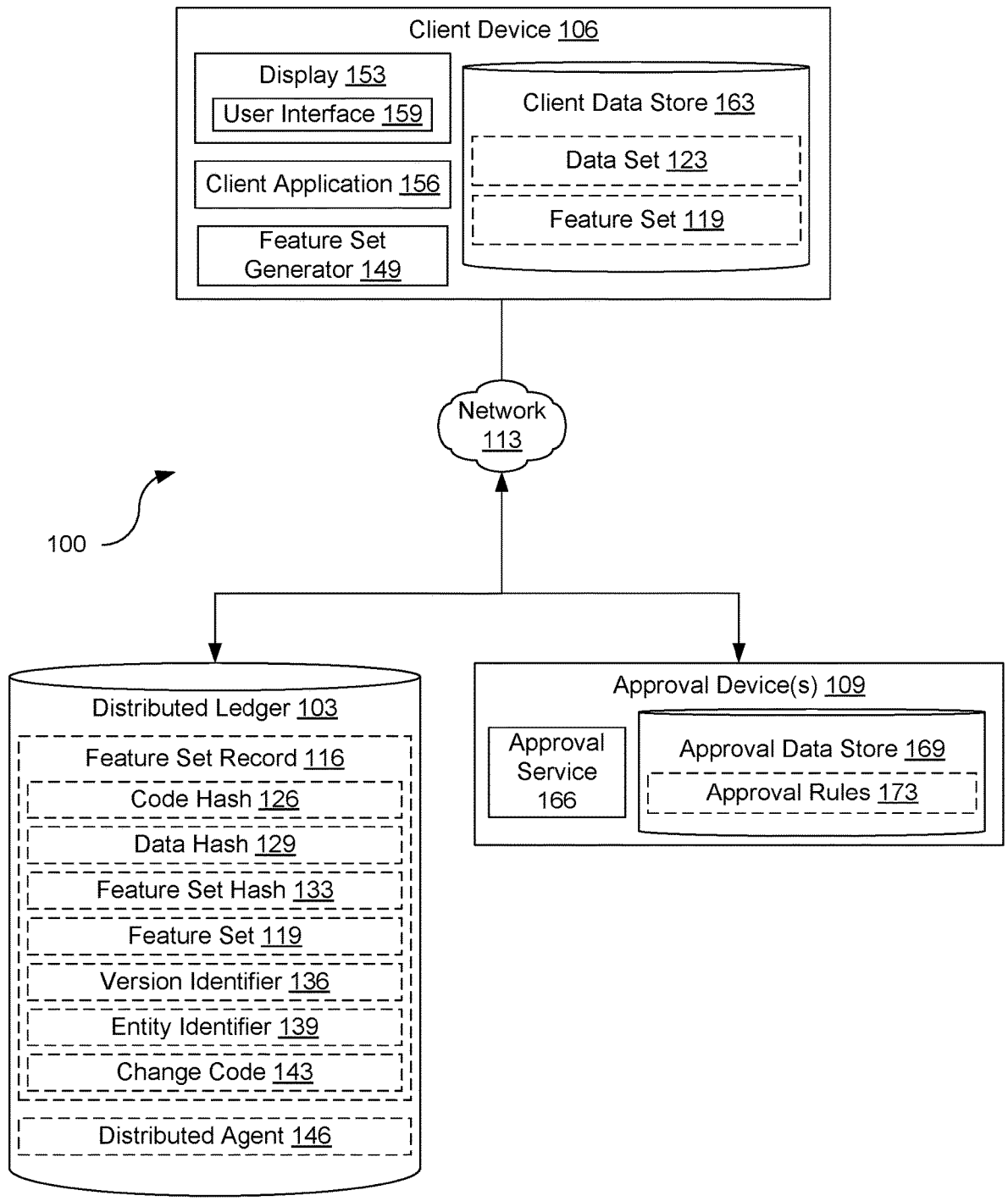
FIG. 1 is a drawing of a network environment according to various embodiments of the present disclosure.

FIG. 1 depicts a network environment 100 according to various embodiments. The network environment 100 can include a distributed ledger 103, one or more client device 106, and one or more approval devices 109. The distributed ledger 103, client devices 106, and approval devices 109 can be in data communication with each other via a network 113.

The network 113 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The distributed ledger 103 can represent a synchronized, eventually consistent, data store spread across multiple nodes in different geographic or network locations. In some instances, a client device 106 or an approval device 109 could also be nodes in the distributed ledger 103, which in other instances, the client device 106 and/or the approval devices 109 may simply have access to the distributed ledger 103. Each member of the distributed ledger 103 can contain a replicated copy of the distributed ledger 103, including all data stored in the distributed ledger 103. Records of transactions involving the distributed ledger 103 can be shared or replicated using a peer-to-peer network connecting the individual members that form the distributed ledger 103. Once a transaction or record is recorded in the distributed ledger 103, it can be replicated across the peer-to-peer network until the record is eventually recorded with all members.

Various consensus methods can be used to ensure that data is written reliably to the distributed ledger 103. Examples of a distributed ledger can include blockchains, distributed hash tables (DHTs), and similar data structures.

Various data can also be stored in a distributed ledger 103, such as one or more feature set records 116. A feature set record 116 can represent an immutable collection of entries related to the creation of a resulting feature set 119 from a respective data set 123. For example, a feature set record 116 could include a code hash 126, a data hash 129, a feature set hash 133, a feature set 119, a version identifier 136, an entity identifier 139, and/or a change code 143.

The code hash 126 can represent a hash or similar identifier for the feature set generator 149 used to generate the feature set 119. The code hash 126 could be generated, for example, by using a cryptographic hash function (e.g., message digest 5 (md5), secure hash algorithm 512 (SHA-512), etc.) to generate a unique hash value or fingerprint representing the feature set generator 149. The code hash 126 can then be used to verify which feature set generator 149 was used to generate the feature set 119. Should the feature set generator 149 be changed (e.g., as a result of a recompilation), the code hash 126 would fail to match the new version of the feature set generator 149.

The data hash 129 can represent a hash or similar identifier for the data set 123 from which the feature set 119 is derived. The data hash 129 could be generated, for example, by using a cryptographic hash function to generate a unique hash value or fingerprint representing the data set 123. Should the data set 123 be modified (e.g., as a result of adding records to, removing records from, or modifying records within the data set 123), then the data hash 129 would fail to match the modified version of the data set 123.

The feature set hash 133 can represent a hash or similar identifier for the feature set 119 generated by the feature set generator 149 from the data set 123. The feature set hash 133 could be generated, for example, by using a cryptographic hash function to generate a unique hash value or fingerprint representing the feature set 119. Should the feature set 119 be modified (e.g., as a result of an update or modification to the feature set generator 149 or an underlying schema), then the feature set hash 133 would fail to match the modified version of the feature set 119.

The feature set 119 can represent a collection of feature vectors, where each feature vector represents a record stored in a respective data set 123. A feature vector is an n-dimensional vector that includes one or more features that, collectively, represent an object or phenomena that is being observed by a machine-learning model. Each feature is a representation of an individual, measurable property or characteristic shared by the objects on which machine-learning analysis or prediction is to be performed. Each feature may be represented as a numeric value to allow a machine-learning model to process the feature.

The version identifier 136 represents the version of the feature set generator 149 used to generate a feature set 119. The version identifier 136 can be used to track which version of a feature set generator 149 was used to create a feature set 119 based upon a respective data set 123.

The entity identifier 139 can represent the enterprise, organization, division, department, team, person, or other entity that created the feature set 119. This information may be used for regulatory or other purposes to track who is creating or utilizing a feature set 119.

The change code 143 can represent an indicator of the reason that a feature set record 116 was created. As a feature set record 116 may be immutable once created and stored in the distributed ledger 103, updates to a feature set record 116 may require that a new feature set record 116 be created. The change code 143 can be used to indicate or track why a feature set record 116 was created. For example, one change code 143 can represent an initial feature set record 116, while another change code 143 could represent an update or modification to the data set 123 and yet another change code 143 could represent a change to the feature set generator 149 or resulting feature set 119.

The distributed agent 146 can represent a script or other executable which can be stored in the distributed ledger 103 and executed by individual hosts or peers of the distributed ledger 103. When a computation is performed by the distributed agent 146, each host or peer that forms the distributed ledger 103 can perform the computation and compare its result with the results computed by other hosts or peers. When a sufficient number of hosts or peers forming the distributed ledger 103 agree on the result of the computation, the result can be stored in the distributed ledger 103 or provided to the computing device that invoked the distributed agent 146. An example of a distributed agent 146 is a "smart contract" used in the ETHEREUM platform, although other distributed ledger or blockchain-based technologies provide similar functionality.

For instance, the distributed agent 146 could be executed to manage data stored in the distributed ledger 103. For example, the distributed agent 146 could create feature set records 116 or to search the distributed ledger 103 for feature set records 116 that match one or more search criteria. Accordingly, the distributed agent 146 could provide a function within an application programming interface (API) that, when invoked, creates a new feature set record 116 using the arguments supplied to the function. To update an existing feature set record 116, the function provided by the distributed agent 146 could be invoked to create a new feature set record 116 that contains the updated information. Similarly, the distributed agent 146 could provide a function that can return one or more feature set records 116 that match the value of a search criterion provided as an argument.

The client device 106 is representative of a plurality of client devices that can be coupled to the network 113. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, and similar devices), or other devices with like capability. The client device 106 can include one or more displays 153, such as liquid crystal displays (LCDs), gas plasma-based flat panel displays, organic light emitting diode (OLED) displays, electrophoretic ink ("E-ink") displays, projectors, or other types of display devices. In some instances, the display 153 can be a component of the client device 106 or can be connected to the client device 106 through a wired or wireless connection.

The client device 106 can be configured to execute various applications such as a client application 156 or other applications. The client application 156 can be executed in a client device 106 to access network content served up by the distributed ledger 103 or other devices or data stores, thereby rendering a user interface 159 on the display 153. To this end, the client application 156 can include a browser, a dedicated application, or other executable, and the user interface 159 can include a network page, an application screen, or other user mechanism for obtaining user input.

The client device 106 can be configured to execute applications beyond the client application 156 such as email applications, social networking applications, word processors, spreadsheets, or other applications.

Also, various data is stored in a client data store 163 that is accessible to the client device 106. The client data store 163 can include relational databases or non-relational databases such as object-oriented databases, hierarchical databases, hash tables or similar key-value data stores, as well as other data storage applications or data structures. The data stored in the client data store 163 is associated with the operation of the various applications or functional entities described below. This data can include a feature set 119, a data set 123, and potentially other data.

The data set 123 represents a set of records that act as raw data for machine-learning. Each record may represent a unique instance of an object or entity. For example, if the data set 123 represents customer data, each record in the data set 123 may represent an individual customer. As another example, if the data set 123 represents a series of images of an object or set of objects, each record in the data set 123 may represent an individual image. However, the records collected and stored in a data set 123 may often not be in a form that is appropriate for consumption by a machine-learning model for analytical or predictive purposes.

As previously discussed, a feature set 119 can be derived, built, or engineered from a respective data set 123. The feature set 119 can differ from a data set 123 in a number of ways. For example, individual data elements or fields in the data set 123 may be converted to a form that can be easily analyzed by a machine-learning model, such as converting data elements into numeric variables. As another example, a feature set 119 may have fewer or more variables than there are data columns (e.g., data elements) in the respective data set 123. This may occur when the machine-learning model requires only a subset of the information contained in the data set 123. For instance, if a machine-learning model only needs the state in which a customer lives to make a prediction, then data columns containing the customer's street address or city may lack a corresponding variable in the feature set 119. As another example, feature engineering may be needed to derive data from the data set 123 for use by a machine-learning model. For example, if the data set 123 contains a start date representing the date that a customer first became a customer (e.g., a first transaction date, a registration date, etc.), a variable in the feature set 119 could be derived from the customer's start date to represent how long a customer has been a customer. Such a variable in the feature set 119 could be calculated by subtracting the start date from the current date.

In addition, one or more approval devices 109 can be in data communication with or operate as nodes within the distributed ledger 103. An approval device 109 can be operated by one or more entities that, in some embodiments, have authority to approve or reject changes to the distributed ledger 103 such as the creation of new feature set records 116. In some implementations, an approval device 109 can be configured to execute an approval service 166.

The approval service 166 can be executed to automatically review an approve the creation and storage of a feature set record 116 in the distributed ledger 103. For example, each request received by the distributed agent 146 to create or update a feature set record 116 could be forwarded to an approval service 166 for evaluation. The approval service 166 could then evaluate and approve or deny each request according to various criteria, as discussed later.

Various data may also be stored in an approval data store 169, which is accessible to applications executed by the approval device 109, such as the approval service 166. The approval data store 169 can include relational databases or non-relational databases such as object-oriented databases, hierarchical databases, hash tables or similar key-value data stores, as well as other data storage applications or data structures. The data stored in the approval data store 169 is associated with the operation of the various applications or functional entities described below. This data can include one or more approval rules 173 and potentially other data.

An approval rule 173 can represent a predefined rule used by an approval service 166 to automatically approve or reject feature set records 116. Accordingly, an approval rule 173 can specify one or more criteria that, if met, would result in a feature set record 116 being approved or rejected for storage in the distributed ledger 103. For example, if a feature set 119 were not generated using an appropriate feature set generator 149, as defined by the code hash 126 and/or the version identifier 136, then an approval rule 173 might specify that the feature set record 116 should be rejected. As another example, if the change code 143 failed to represent a pre-approved reason for modifying a feature set record 116, then an approval rule 173 might specify that the feature set record 116 should be rejected. Similarly, if an unapproved data set 123, as represented by the data hash 129, were used as the based for a feature set 119, then an approval rule 173 might specify that the feature set record 116 should be rejected.

Next, a general description of the operation of the various components of the network environment 200 is provided. Although the following description provides an example of the interactions that may occur between the various components of the network environment 100, other interactions may also occur according to various embodiments of the present disclosure.

To begin, a user of a client device 106 configures the feature set generator 149 on a client device 106 to generate a feature set 119 from a respective data set 123. For example, the user may have identified which variables are needed for the feature set 119 in order to accurately model a problem to be analyzed by a machine-learning model. The user could then configure the feature set generator 149 to convert records in the data set 123 into feature vectors in the feature set 119 that contain the appropriate variables. The feature set generator 149 can then be executed to process the data set 123 to generate the feature set 119.

The client application 156 could then be used to register the resultant feature set 119 with the distributed ledger 103. For example, the client application 156 could represent a node, client, or browser of the distributed ledger 103. After being supplied with the data set 123, the feature set 119, and the feature set generator 149, the client application 156 could provide these as arguments to a function provided by the distributed agent (e.g., as part of a publicly available application programming interface (API)). This could be done in response to a user manipulating the user interface 159 to select the data set 123, the feature set 119, and/or the feature set generator 149. Additional information, such as the version identifier 136, the entity identifier 139, or the change code 143 may also be supplied to the distributed agent 146.

The distributed agent 146 can create a feature set record 116 using the information supplied by the client application 156. Accordingly, the distributed agent 146 could calculate the code hash 126, the data hash 129, and/or the feature set hash 133 as appropriate. Once the hashes are created, the distributed agent 146 could save the newly created feature set record 116 to the distributed ledger 103. In some implementations, the distributed agent 146 may query the distributed ledger 103 to confirm that no duplicate or otherwise conflicting feature set records 116 exist. If a conflict is discovered the distributed agent 146 may refuse to save the feature set record 116 and instead return an error message. Similarly, the distributed agent 146 may forward the newly created feature set record 116 to the approval service 166 and wait for the approval service 166 to approve or reject the feature set record 116. If approved, the distributed agent 146 could save the feature set record 116 to the distributed ledger 103.

Subsequently, the same or another client device 106 may attempt to search the distributed ledger 103. The user may select any one or more search criteria using the user interface 159, which can be supplied by the client application 156 to the distributed agent 146 using a search function provided by an API of the distributed agent 146. For example, a user could provide a feature set hash 133 to search for all feature set records 116 with a respective feature set hash 133. This could review a feature set record 116 for a specific feature set 119. As another example, a user could provide a code hash 126 to search for all feature set records 116 that used a particular feature set generator 149 to generate a feature set 119. However, any other element or combination of elements stored in a feature set record 116 could be used as search criteria. Once the distributed agent 146 has received the search criteria, it can search the distributed ledger 103 for matching feature set records 116 and return them to the requesting client application 156. This search functionality can allow for users, auditors, or regulators to query the distributed ledger 103 to identify relevant information about a particular data set 123, feature set 119, or feature set generator 149 that is currently deployed.

Figure 2:
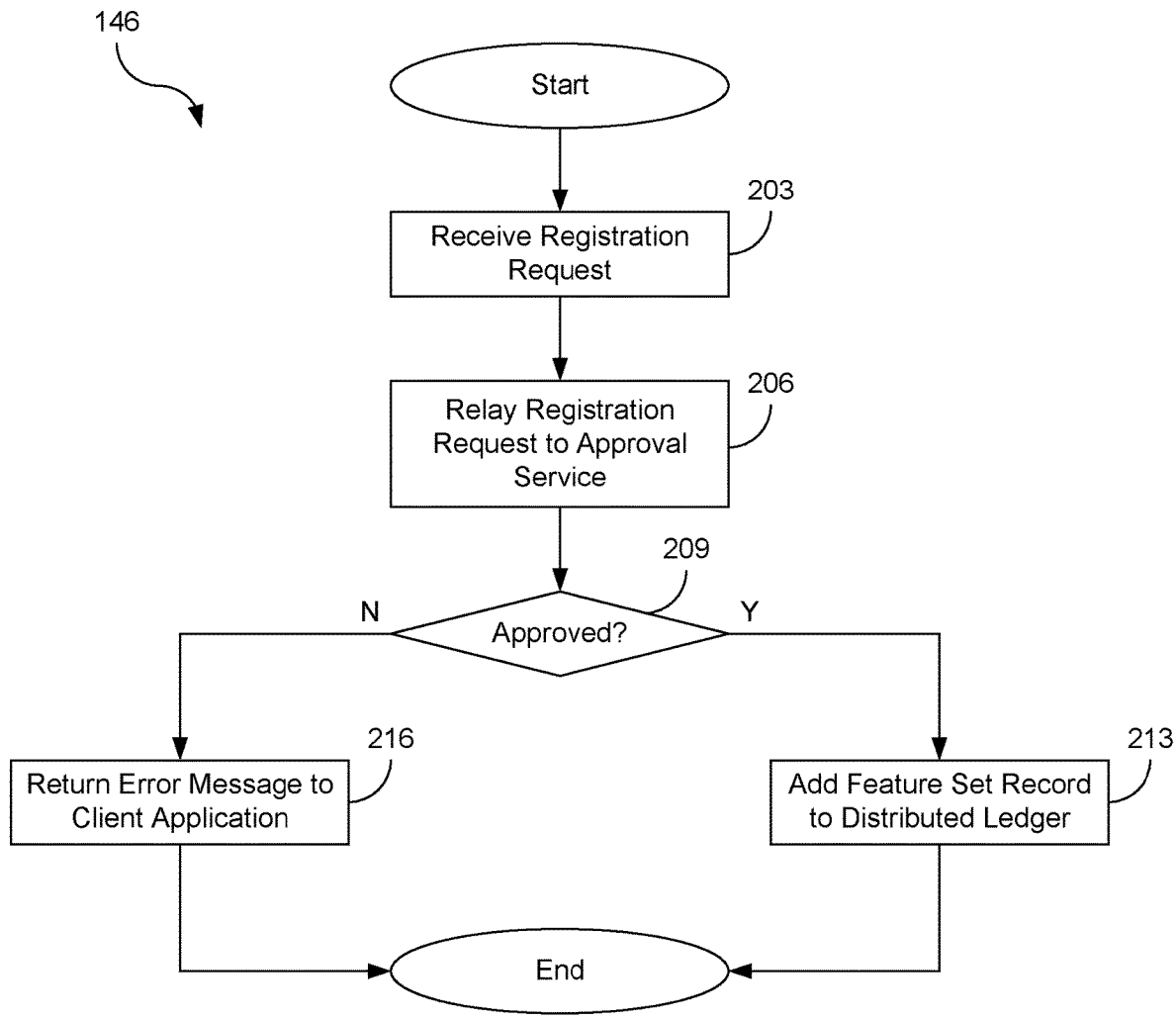
FIGS. 2-7 are flowcharts illustrating examples of functionality implemented as portions of applications executed in the network environment of FIG. 1 according to various embodiments of the present disclosure.

Referring next to FIG. 2, shown is a flowchart that provides one example of the operation of a portion of the distributed agent 146. The flowchart of FIG. 2 provides merely an example of the many different types of functional arrangements that can be employed to implement the operation of the depicted portion of the distributed agent 146. As an alternative, the flowchart of FIG. 2 can be viewed as depicting an example of elements of a method implemented within the network environment 100.

Beginning with block 203, the distributed agent 146 can receive a registration request from a client application 156 executed by a client device 106. The registration request can include various information related to the data set 123, feature set generator 149 and resultant feature set 119. In some instances, the registration request could include a code hash 126 and a data hash 129. In some implementations, the registration request could include additional information, such as a feature set hash 133 and/or the feature set 119 itself, a version identifier 136 of the feature set generator 149 or feature set 119, an entity identifier 139 associated with the registration request or creation of the feature set 119, etc.

Next at block 206, the distributed agent 146 can relay the registration request to an approval service 166 executed by an approval device 109. In some implementations, the approval device 109 may act or participate as a node in the distributed ledger 103. As previously discussed, the approval service 166 may be executed to determine whether feature set records 116 may be saved to the distributed ledger 103 by the distributed agent 146.

Then at block 209, the distributed agent 146 receives a response from the approval service 166. The response can indicate whether a feature set record 116 based on the registration request received at block 203 is approved. If approved, the process proceeds to block 213. However, if the response indicates that a feature set record 116 based on the registration request is unapproved, then the process proceeds instead to block 216.

Proceeding to block 213, the distributed agent 146 can create and store a feature set record 116 in the distributed ledger 103. The feature set record 116 can include the information provided in the registration request at block 203. Once written to a node in the distributed ledger 103, the feature set record 116 will propagate to other nodes in the distributed ledger 103. After the feature set record 116 is saved to the distributed ledger 103, the process ends.

However, if the process proceeds instead to block 216, the distributed agent 146 can instead return an error message to the client application 156. The error message may include information such as the reason that the request to register the feature set 119 with the distributed ledger 103 was rejected by the approval service 166 and potentially other information. Once the error message is returned to the client application 156, the process ends.

Figure 3:
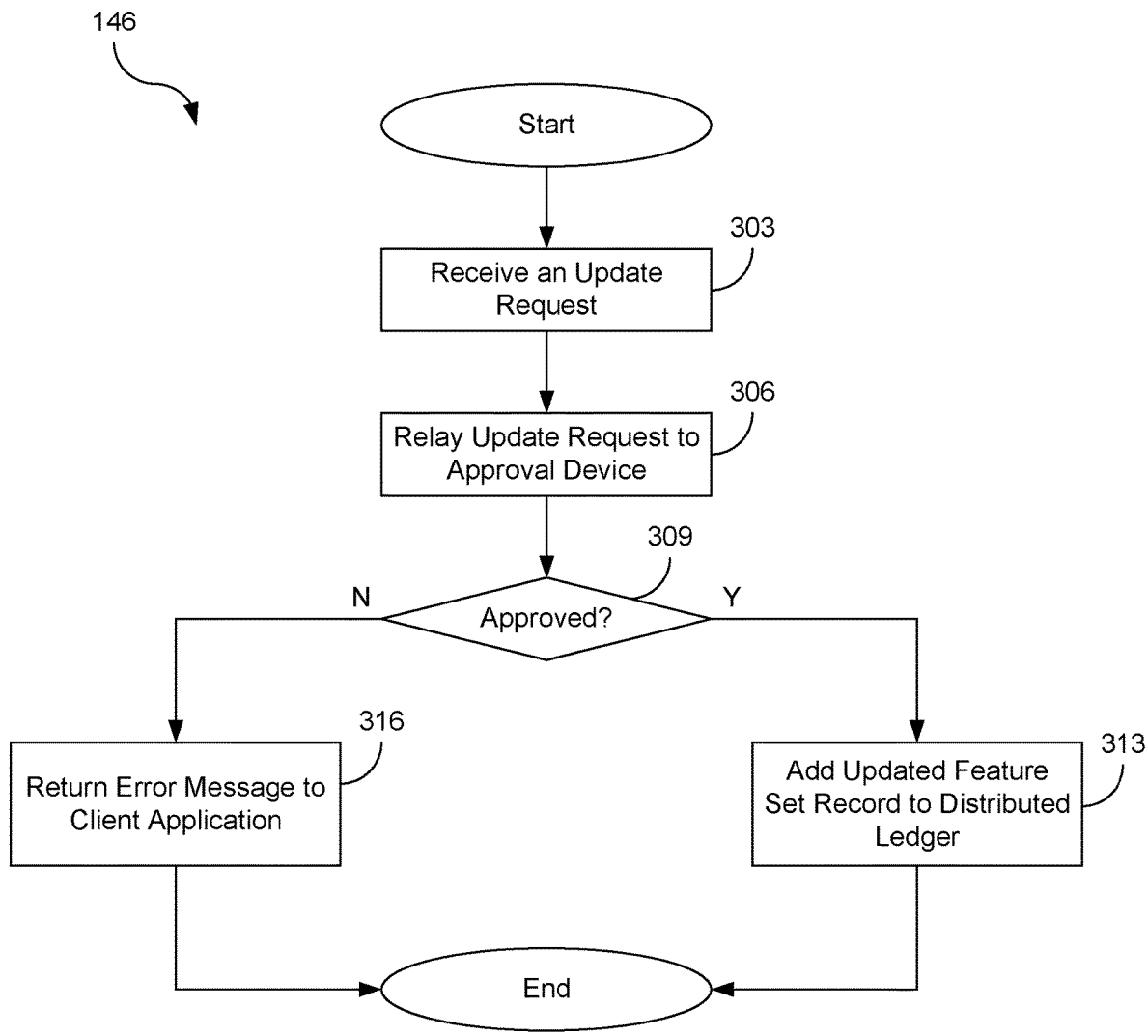

Referring next to FIG. 3, shown is a flowchart that provides one example of the operation of a portion of the distributed agent 146. The flowchart of FIG. 3 provides merely an example of the many different types of functional arrangements that can be employed to implement the operation of the depicted portion of the distributed agent 146. As an alternative, the flowchart of FIG. 3 can be viewed as depicting an example of elements of a method implemented within the network environment 100.

Beginning with block 303, the distributed agent 146 can receive an update request from a client application 156 executed by a client device 106. The update request may identify a specific feature set record 116 that is to be updated. For example, the feature set record 116 may contain an address or unique identifier that allows the feature set record 116 to be uniquely identified within the distributed ledger 103, and such an address or unique identifier may be included in the update request. As another example, the update request may include a tuple containing the code hash 126, data hash 129, and feature set hash 133 of a feature set record 116.

The update request can also include the information to be changed in the identified feature set record 116. For example, if a new version identifier 136 or code hash 126 should be stored (e.g., due to the use of a new version of the feature set generator 149), this information might be included in the update request. As another example, if a new feature set 119 has been generated from a respective data set 123 (e.g., due to improved feature engineering identifying a better fitting feature set 119), the new feature set 119 and/or a new feature set hash 133 may be included in the updated request.

Next at block 306, the distributed agent 146 can relay the update request to an approval service 166 executed by an approval device 109. In some implementations, the approval device 109 may act or participate as a node in the distributed ledger 103. As previously discussed, the approval service 166 may be executed to determine whether feature set records 116 stored in the distributed ledger 103 may be updated by the distributed agent 146.

Then at block 209, the distributed agent 146 receives a response from the approval service 166. The response can indicate whether the identified feature set record 116 is permitted to be updated. If permitted or otherwise approved, the process proceeds to block 313. However, if the response indicates that an update to the feature set record 116 is not permitted or otherwise unapproved, then the process proceeds instead to block 316.

Proceeding to block 13, the distributed agent 146 can create and store a new feature set record 116 in the distributed ledger 103. The new feature set record 116 can include the information provided in the update request at block 303 to reflect the current state associated with the particular feature set 119. Because feature set records 116 stored in the distributed ledger 103 are immutable, a new feature set record 116 will be written instead of the prior feature set record 116 being modified. Once written to a node in the distributed ledger 103, the new feature set record 116 will propagate to other nodes in the distributed ledger 103. Other processes can then reference the most recently saved feature set record 116 when querying or confirming the current state of a feature set 119, while older feature set records 116 may be retrieved for historical or auditing purposes. After the new feature set record 116 is saved to the distributed ledger 103, the process ends.

However, if the process proceeds instead to block 316, the distributed agent 146 can instead return an error message to the client application 156. The error message may include information such as the reason that the request to update the feature set record 116 in the distributed ledger 103 was rejected by the approval service 166 and potentially other information. Once the error message is returned to the client application 156, the process ends.

Figure 4:
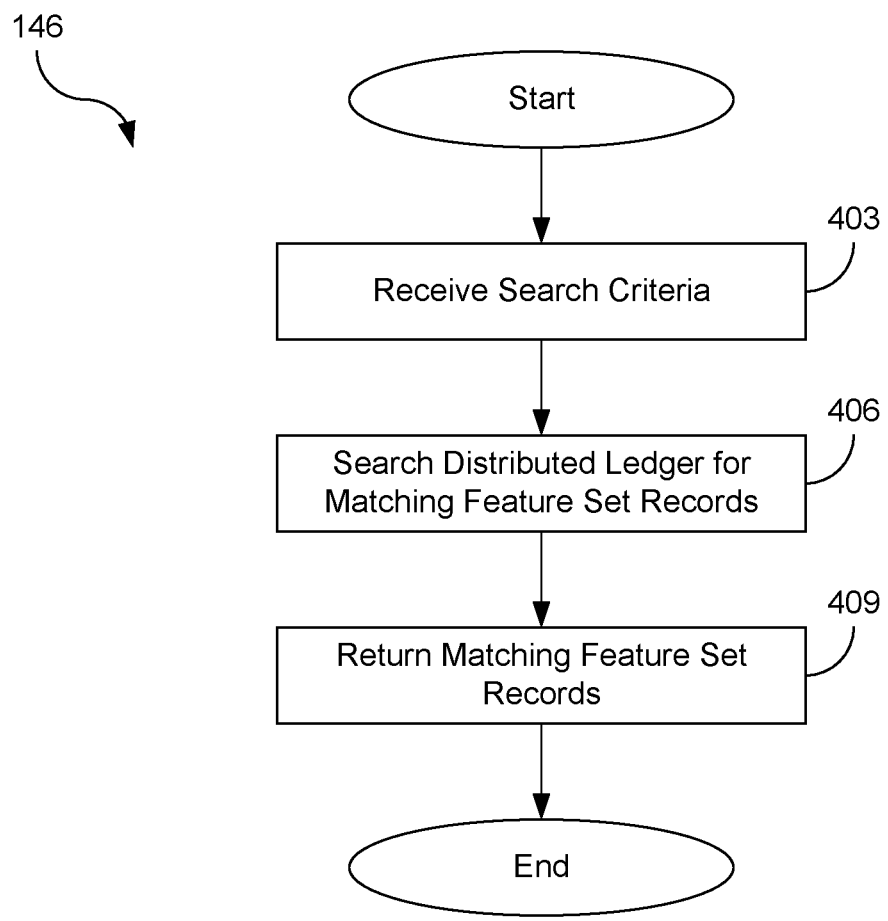

Referring next to FIG. 4, shown is a flowchart that provides one example of the operation of a portion of the distributed agent 146. The flowchart of FIG. 4 provides merely an example of the many different types of functional arrangements that can be employed to implement the operation of the depicted portion of the distributed agent 146. As an alternative, the flowchart of FIG. 4 can be viewed as depicting an example of elements of a method implemented within the network environment 100.

Beginning with block 403, the distributed agent 146 can receive one or more search criteria from a client application 156. The search criteria may be supplied as arguments to a function provided by an application programing interface made available by the distributed agent 146. Any element or value in a feature set record 116, or combination of elements or values, may be used as a search criterion. For example, a simple search would supply a data hash 129 as a search criterion, which could be used to search for all feature set records 116 of all feature sets 119 derived from a data set 123 identified by the supplied data hash 129. As another example, a code hash 126 and a data hash 129 could be supplied as arguments to search for all feature set records 116 associated with the combination of the code hash 126 and the data hash 129. This search could be used, for example, to retrieve feature sets 119 stored in the feature set records 116 of the distributed ledger 103.

Next at block 406, distributed agent 146 can use the search criteria received at block 403 to search the distributed ledger 103. For example, the distributed agent 146 may identify all feature set records 116 that match each of the supplied criteria. As another example, the distributed agent 146 could identify feature set records 116 that match one or more of the supplied criteria. In order to perform searches in a timely manner, searches may be performed in parallel using approaches such as MapReduce or similar split-apply-combine strategies.

Then at block 409, the distributed agent 146 can return the results to the client application 156. In some implementations, the results may be provided in the form of a list of addresses in the distributed ledger 103 for the matching feature set records 116. In other implementations, the results may include copies of the feature set records 116 themselves.

Figure 5:
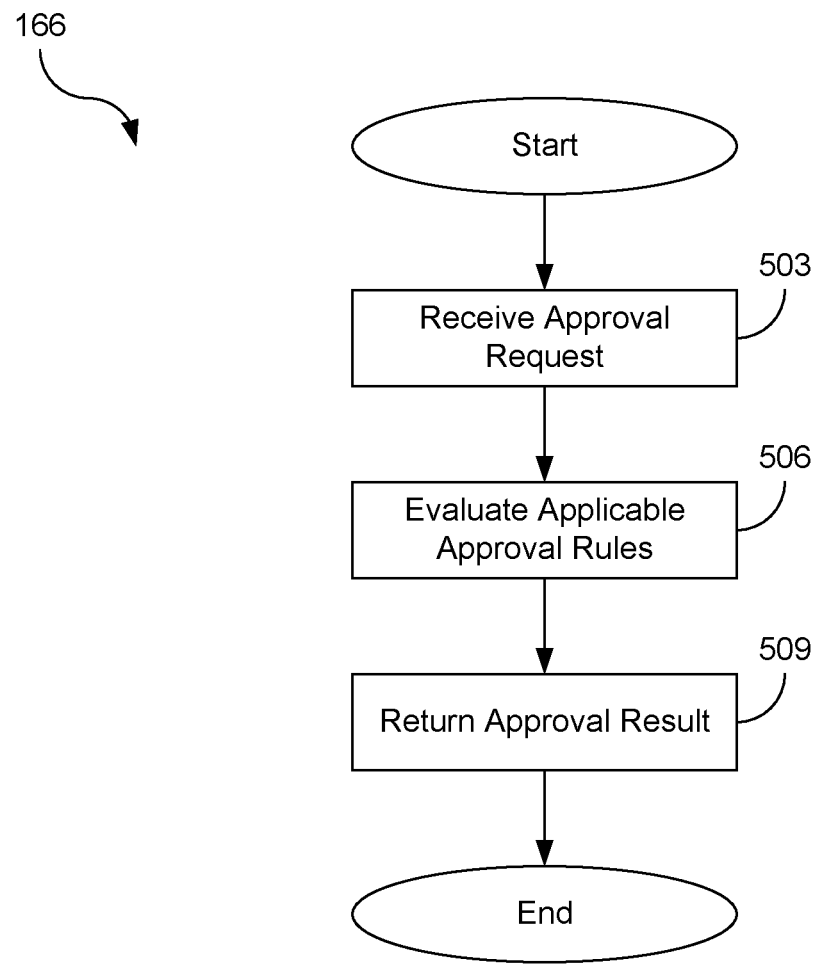

Referring next to FIG. 5, shown is a flowchart that provides one example of the operation of a portion of the approval service 166. The flowchart of FIG. 5 provides merely an example of the many different types of functional arrangements that can be employed to implement the operation of the depicted portion of the approval service 166. As an alternative, the flowchart of FIG. 5 can be viewed as depicting an example of elements of a method implemented within the network environment 100.

Beginning with block 503, the approval service 166 can receive a request to approve a write to the distributed ledger 103. For example, the approval service 166 may receive a request from the distributed agent 146 for the approval service 166 to approve creation of a new feature set record 116 to register a new feature set 119. Similarly, the approval service 166 could receive a request from the distributed agent 146 to approve creation of a new feature set record 116 in order to update information stored in a previous feature set record 116.

Then at block 506, the approval service 166 can evaluate one or more approval rules 173 to determine whether the request received at block 503 should be approved or denied. Approval may be performed using a "whitelist" (e.g., a request will be denied unless it complies with one or more approval rules 173) or a "blacklist" approach (e.g., a request will be approved unless it violates one or more approval rules 173).

Applicable approval rules 173 may be identified according to various criteria. For example, some approval rules 173 may specify that they are applicable to all entries stored in the distributed ledger 103, in which case they would be evaluated every time the distributed agent 146 requests approval to create and store a feature set record 116 in the distributed ledger 103. Other approval rules 173 may only apply to specific entities, data sets 123, feature set generators 149, feature sets 119, or versions thereof. Such specific approval rules 173 may be identified using information included in the approval request, such as search for all approval rules 173 applicable to a data set 123 by searching the approval rules 173 using the data hash included in the approval request received from the distributed agent 146.

Approval rules 173 can embody many different policies. For example, an approval rule 173 may specify that only certain entities, as represented by the entity identifier 139, are permitted to have feature set records 116 created. As another example, an approval rule 173 may specify that only approved data sets 123, as identified by respective data hashes 129 identified in the approval rule 173, may be used for creation of feature sets 119, and therefore feature set records 116 may only be created if they are linked to or include a data hash 129 of an approved data set 123. A similar approval rule 173 could be used for approved feature set generators 149 and their respective code hashes 126. Moreover, these example approval rules 173 are intended to be illustrative, but non-limiting. As another example, the approval rule 173 may specify which change codes 143 map to permitted reasons for creating or updating a feature set record 116. A variety of situation or implementation specific approval rules 173 could be created and enforced by the approval service 166 according to various embodiments or implementations.

Next at block 509, the approval service 166 can return the result of the evaluation of block 506. If the request complies with all applicable approval rules 173, then the response could be an indication that the request to create and store a feature set record 116 is approved. Similarly, if the request fails to comply with at least one applicable approval rule 173 or, in stricter implementations, fails to comply with any approval rules 173, then the response could be an indication that the request is rejected.

Figure 6:
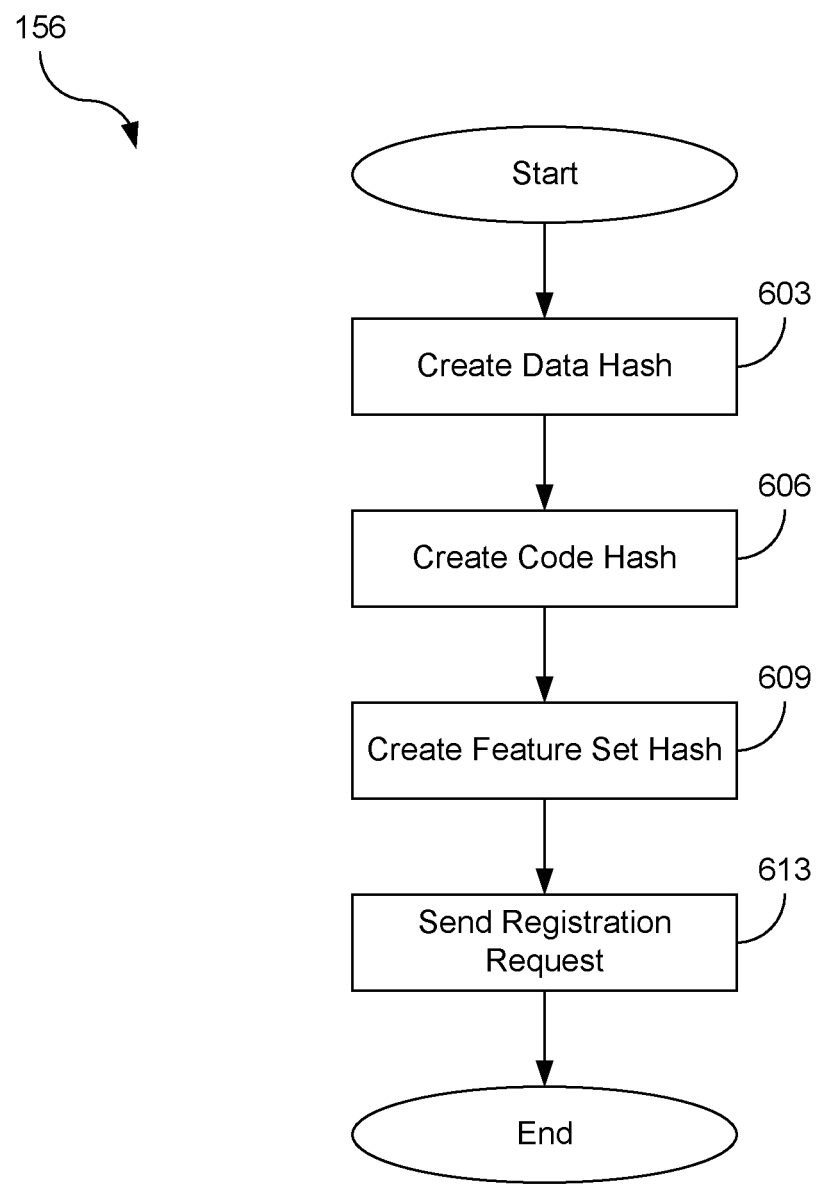

Referring next to FIG. 6, shown is a flowchart that provides one example of the operation of a portion of the client application 156. The flowchart of FIG. 6 provides merely an example of the many different types of functional arrangements that can be employed to implement the operation of the depicted portion of the client application 156. As an alternative, the flowchart of FIG. 6 can be viewed as depicting an example of elements of a method implemented within the network environment 100.

Beginning with block 603, the client application 156 can generate a data hash 129 based on a data set 123 used to create a feature set 119. The data hash 129 could be created in several ways. One way would be to provide the entire data set 123 as an input to a cryptographic hash function to generate a hash. However, this approach may include records in the data set 123 that are not actually processed and turned into feature vectors within the feature set 119 by the feature set generator 149. Accordingly, as each record in the data set 123 is processed, it could be added combined with a previous hash to create a new input to a cryptographic hash function. This approach is illustrated in the following recursive function:

$$\text{Hash}_i = \text{Hash}(\text{Hash}_{i-1} + \text{Data Record}_i) \qquad (1)$$

where the cryptographic hash of the $i^{th}$ record in a data set 123 is equal to the output of the cryptographic hash function with the $i^{th}-1$ cryptographic hash and the current ($i^{th}$) record in the data set 123 as inputs. This approach will allow for quick computation of a data hash 129 that represents all or a subset of the records in the data set 123.

Then at block 606, the client application 156 can create a code hash 126 of the feature set generator 149. For example, the client application 156 may supply the feature set generator 149 as an input to a cryptographic hash function and store the result.

Next at block 609, the client application 156 can create a feature set hash 133 of the feature set 119 generated by the feature set generator 149 from the data set 123. For example, the client application 156 could supply the feature set 119 as an input to a cryptographic hash function and store the result.

Finally, at block 613, the client application 156 can send a registration request to the distributed agent 146 hosted by the distributed ledger 103. The client application 156 may include the data hash 129, code hash 126, and/or the feature set hash 133 generated at blocks 603, 606, and 609. In some implementations, the client application 156 may include additional information, such as the version identifier for the feature set generator 149 used, an entity identifier 139 specifying the entity responsible for or placing the request, and the feature set 119 itself in some implementations. Once the registration request is sent to the distributed agent 146, the process can end, although some embodiments may further process confirmation or error messages provided by the distributed agent 146 in response to the request.

Figure 7:
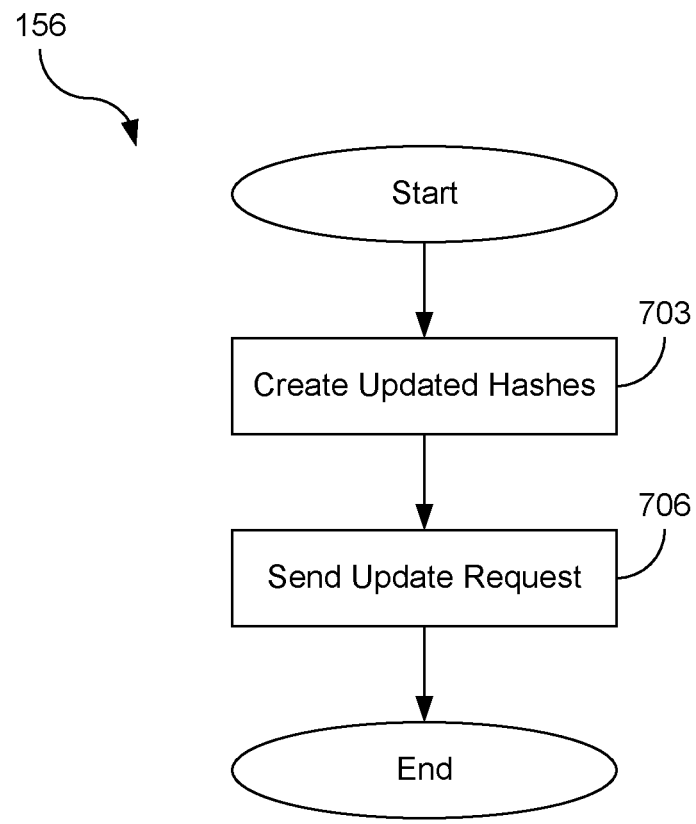

Referring next to FIG. 7, shown is a flowchart that provides one example of the operation of a portion of the client application 156. The flowchart of FIG. 7 provides merely an example of the many different types of functional arrangements that can be employed to implement the operation of the depicted portion of the client application 156. As an alternative, the flowchart of FIG. 7 can be viewed as depicting an example of elements of a method implemented within the network environment 100.

Beginning with block 703, the client application 156 can generate updated hashes, if necessary. For example, a change to the data set 123 (e.g., the addition of new records) would require a recomputation of the data hash 129, which could be done in a manner similar to that described previously at block 603. As another example, a change to the feature set generator 149 (e.g., improvements to generate better fitting feature sets 119 from the data set 123) would require a recomputation of the code hash 126, which could be done in a manner similar to that described previously at block 606. Likewise, changes to the data set 123 or feature set generator 149 would also cause the resulting feature set 119 to differ, which in turn would necessitate an updated feature set hash 133. The updated feature set hash 133 could be computed in a manner similar to that previously described at block 609.

Next at block 706, the client application 156 could send an update request to the distributed agent 146. The update request could include any updated hashes computed previously at block 703 and any additional information required. For example, an updated version identifier 136, entity identifier 139, or even the updated feature set 119 itself could be included in the update request. The client application 156 may also include a unique identifier for the feature set record 116 to be updated, such as a distributed ledger 103 address or a tuple of values that uniquely identifies the feature set record 116 with respect to other feature set records 116. Once the update request is sent, the process may end, although the client application 156 may continue execution to process responses received from the distributed agent 146, such as confirmations or error messages.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:
1. A system, comprising:
 a computing device comprising a processor and a memory;
 an approval service comprising a set of machine-readable instructions stored in the memory that, when executed by the processor, cause the computing device to at least:
  receive, from a distributed agent, an approval request to approve creation of a feature set record in a distributed ledger, the approval request comprising a feature set hash representing a feature set, a code hash representing a feature set generator, and a data hash representing a data set;

generate an approval decision for the feature set record based at least in part on the approval request and at least one approval rule stored in an approval data store; and transmit the approval decision to the distributed agent, wherein the approval decision approves or rejects creation of the feature set record in the distributed ledger.

2. The system of claim 1, wherein the at least one approval rule indicates whether the code hash is associated with an approved feature set generator.

3. The system of claim 1, wherein the approval request further comprises a change code that indicates a reason for a change to a preexisting feature set record.

4. The system of claim 3, wherein the at least one approval rule indicates whether the change code is associated with an approved reason to create the feature set record.

5. The system of claim 1, wherein the distributed agent manages data stored in the distributed ledger.

6. The system of claim 1, wherein the approval service comprises a node of the distributed ledger.

7. The system of claim 1, wherein the feature set comprises a set of feature vectors, wherein a respective one of the feature vectors represents a record stored in a data set.

8. A computer-implemented method performed by an approval service, the computer-implemented method comprising:

receiving, from a distributed agent, an approval request to approve creation of a feature set record in a distributed ledger, the approval request comprising at least one of: a code hash representing a feature set generator, a data hash representing a data set, or any combination thereof;

generating an approval decision for the feature set record based at least in part on the approval request and at least one approval rule stored in an approval data store; and transmitting the approval decision to the distributed agent, wherein the approval decision approves or rejects creation of the feature set record in the distributed ledger.

9. The computer-implemented of claim 8, wherein the approval request further comprises a feature set hash representing a feature set.

10. The computer-implemented of claim 8, wherein the approval request further comprises an entity identifier.

11. The computer-implemented of claim 10, wherein the at least one approval rule indicates whether the entity identifier is associated with an entity that is approved to create the feature set record.

12. The computer-implemented of claim 8, wherein the approval decision is transmitted to the distributed agent the distributed ledger.

13. The computer-implemented of claim 8, wherein the approval request is received using a node of the distributed ledger.

14. The computer-implemented of claim 8, wherein the feature set comprises a set of feature vectors, wherein a respective one of the feature vectors represents a record stored in a data set.

15. A non-transitory, computer-readable medium, comprising machine-readable instructions that, when executed by a processor of a computing device, cause the computing device to at least:

receive an approval request to approve creation of a feature set record in a distributed ledger comprising at least one of: a feature set hash representing a feature set, a code hash representing a feature set generator, a data hash representing a data set, or any combination thereof;

generate an approval decision for the feature set record based at least in part on the approval request and at least one approval rule stored in an approval data store; and transmit the approval decision to approve or reject creation of the feature set record in the distributed ledger.

16. The non-transitory, computer-readable medium of claim 15, wherein the at least one approval rule indicates whether the feature set record is associated with an approved feature set generator.

17. The non-transitory, computer-readable medium of claim 15, wherein the approval request further comprises a change code indicative of: an initial feature set record, or a reason for a change to a preexisting feature set record.

18. The non-transitory, computer-readable medium of claim 17, wherein the at least one approval rule indicates whether the change code is associated with an approved reason to create the feature set record.

19. The non-transitory, computer-readable medium of claim 15, wherein the approval request further comprises an entity identifier, and the at least one approval rule indicates whether the entity identifier is associated with an entity that is approved to create the feature set record.

20. The non-transitory, computer-readable medium of claim 15, wherein the approval service comprises a node of the distributed ledger.

* * * * *